United States Patent
McLennan et al.

(10) Patent No.: US 11,317,035 B1
(45) Date of Patent: Apr. 26, 2022

(54) METHOD AND SYSTEM FOR SYNCHRONIZED PLAYBACK OF MULTIPLE VIDEO STREAMS OVER A COMPUTER NETWORK

(71) Applicant: Action Streamer, LLC, Cincinnati, OH (US)

(72) Inventors: Christopher S. McLennan, Cincinnati, OH (US); Alexander Jewell Motz, Cincinnati, OH (US)

(73) Assignee: Action Streamer, LLC, Cincinnati, OH (US)

( * ) Notice: Subject to any disclaimer, the term of this patent is extended or adjusted under 35 U.S.C. 154(b) by 0 days.

(21) Appl. No.: 17/244,076

(22) Filed: Apr. 29, 2021

Related U.S. Application Data

(60) Provisional application No. 63/017,093, filed on Apr. 29, 2020.

(51) Int. Cl.
| | |
|---|---|
| *H04N 5/268* | (2006.01) |
| *H04N 5/04* | (2006.01) |
| *H04N 21/43* | (2011.01) |
| *H04N 5/265* | (2006.01) |
| *H04N 7/08* | (2006.01) |
| *H04N 21/242* | (2011.01) |

(52) U.S. Cl.
CPC ............... *H04N 5/268* (2013.01); *H04N 5/04* (2013.01); *H04N 5/265* (2013.01); *H04N 7/0806* (2013.01); *H04N 21/242* (2013.01); *H04N 21/4302* (2013.01); *H04N 21/4307* (2013.01)

(58) Field of Classification Search
CPC ......... H04N 21/21805; H04N 21/4302; H04N 21/242; H04N 21/4307; H04N 5/268; H04N 5/04; H04N 5/265; H04N 7/0806
See application file for complete search history.

(56) References Cited

U.S. PATENT DOCUMENTS

| | | | |
|---|---|---|---|
| 9,591,041 B1 | 3/2017 | McLennan | |
| 2010/0195974 A1* | 8/2010 | Zheng | ............... H04N 5/76 386/343 |
| 2014/0013228 A1* | 1/2014 | Hutten | ............... G06F 3/04815 715/720 |
| 2018/0255332 A1* | 9/2018 | Heusser | ........... H04N 21/21805 |

OTHER PUBLICATIONS https://en.m.wikipedia.org/wiki/Network_Time_Protocol, accessed on Jun. 18, 2021.
https://en.m.wikipedia.org/wiki/Global_Positioning_System, accessed on Jun. 18, 2021.
Joseph Knoop, Overwatch League debuts enhanced command center feature on Twitch, GameDaily.biz, Jan. 31, 2019, *available at* https://gamedaily.biz/article/560/overwatch-league-debuts-enhanced-command-center-feature-on-twitch, printed Nov. 22, 2021; 4 pages.

* cited by examiner

*Primary Examiner* — Oschta I Montoya
(74) *Attorney, Agent, or Firm* — Frost Brown Todd LLC

(57) ABSTRACT

It is possible to synchronize multiple video streams, even when one or more of those streams are delivered over computer networks that are not deterministic with respect to packet time delivery, as is the case with IP networks. This technology can be applied in a variety of contexts, including allowing viewers to be presented with streams of a sporting event simultaneously and in a synchronized manner.

12 Claims, 7 Drawing Sheets

208

204

201 202 203

205

206 207

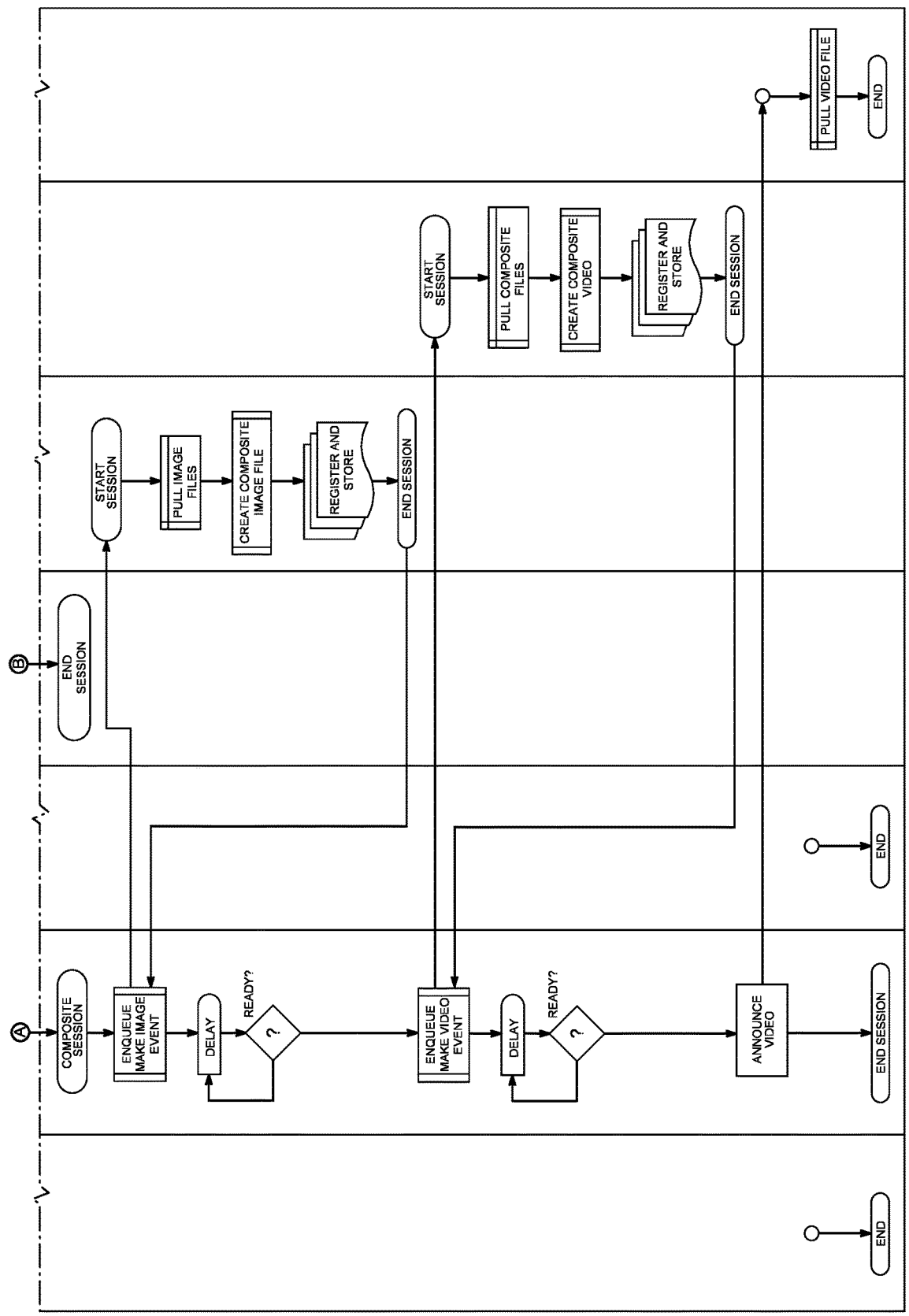

ABSTRACT# METHOD AND SYSTEM FOR SYNCHRONIZED PLAYBACK OF MULTIPLE VIDEO STREAMS OVER A COMPUTER NETWORK

CROSS REFERENCE TO RELATED APPLICATIONS

This application is related to, claims priority from, and incorporates by reference in its entirety, provisional patent application 63/017,093, filed on Apr. 29, 2020 and having the same title as listed above.

FIELD

The technology disclosed herein can be applied to the synchronization of multiple video streams over a computer network.

BACKGROUND

Internet protocol networks are not deterministic regarding packet time delivery. This can pose challenges with video streams, which are inherently in the time domain. For example, the existence of different video feeds being ingested into a transcoding pipeline with 1) different video attributes such as resolution, color depth, and frames per second, 2) different video encoding parameters such as video codec, bit rate, bit depth, and 3) different transfer speeds and transfer buffer delays can make it almost impossible to synchronize streams once the streams have been started. Further complications can be introduced when a stream is distributed over a broadcast network. For example, there are delays built into television production and transfer buffers moving that content over various distribution channels before the stream is finally broadcast to the user. Accordingly, there is a need for improved technology to allow synchronization of video streams.

SUMMARY

Disclosed herein is technology which can be implemented in a variety of manners, including systems and methods for synchronizing playback of multiple video streams over a computer network. Other ways of implementing the disclosed technology are also possible, and so the material set forth in this summary should be understood as being illustrative only, and should not be treated as limiting.

BRIEF DESCRIPTION OF THE DRAWINGS

The drawings and detailed description which follow are intended to be merely illustrative and are not intended to limit the scope of the invention as set forth in the appended claims.

FIGS. 6A-6B show a set of interactions that may be performed to provide composite multi-stream synchronization in some embodiments.

DETAILED DESCRIPTION

The inventors have conceived of novel technology which can be used for a variety of purposes, including synchronized playback of multiple video streams over a computer network. While the present disclosure focuses on embodiments in which the disclosed technology is used to synchronize multiple video streams depicting a sporting event, it should be understood that the disclosed technology can be used for other purposes as well, such as synchronizing video streams depicting some other type of event (e.g., a political rally or other newsworthy event), synchronizing video streams that do not depict a common event (e.g., a first video stream depicting an event and a second video stream depicting actions from a location remote from the event to provide context), or establishing a time relationship between video streams that may not have originally been synchronized (e.g., in a case where continuous real time playback of the originally non-synchronized video streams may illustrate an otherwise obscure relationship between them). Similarly, while aspects of the disclosed technology can be used for synchronizing video streams over a computer network, some embodiments may synchronize other types of video, such as video distributed over a broadcast television network. Accordingly, the disclosure set forth herein should be understood as being illustrative only, and should not be treated as limiting on the protection provided by this or any related document.

Figure 1:
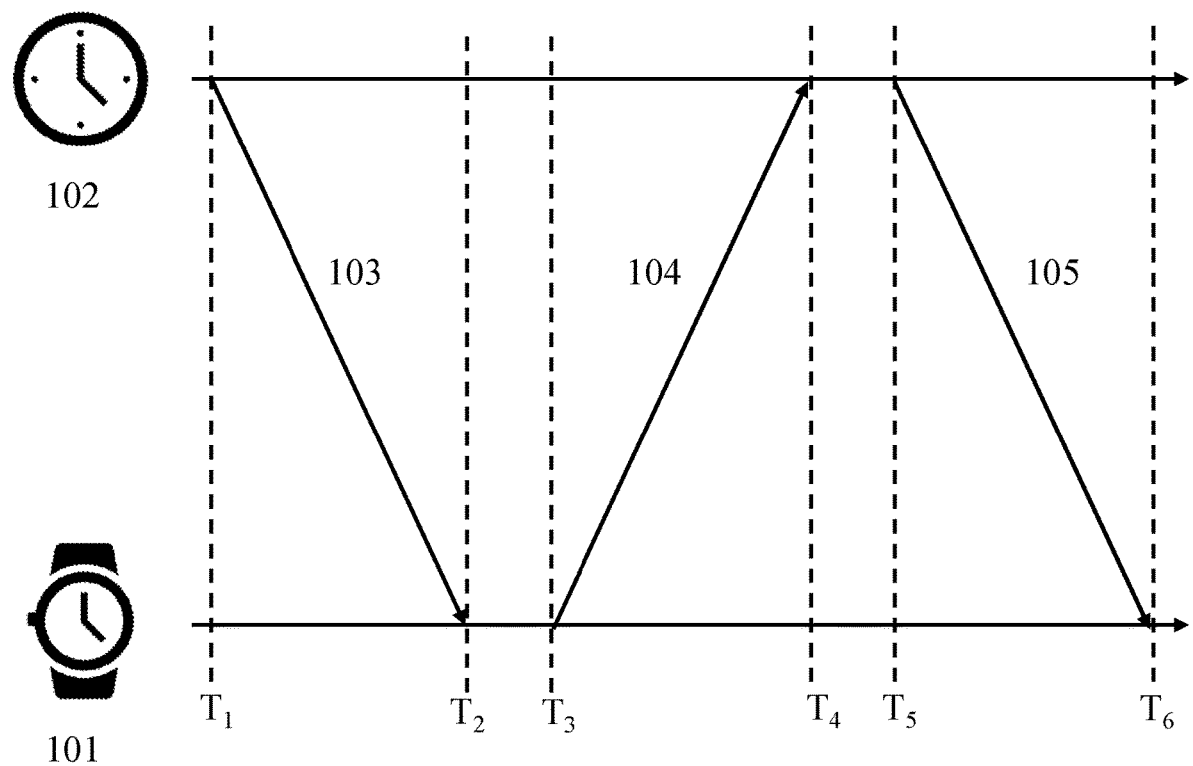
FIG. 1 illustrates an information exchange that can be used when synchronizing a device clock with a reference clock.

Turning now to the figures, FIG. 1 illustrates a process by which a device clock 101 can exchange information to allow it to be synchronized with a reference clock 102. For ease of description, FIG. 1 illustrates only a single device clock 101 being synchronized with the reference clock 102. However, it should be understood that, in practice, there would likely be a plurality of device clocks each performing acts similar to those illustrated for the single device clock 101 of FIG. 1, such that all of the device clocks would be synchronized with the reference clock 102.

In the process of FIG. 1, initially the reference clock 102 will measure its own local time $T_1$, and will issue a synchronization message 103 including that local time to the device clock 101 (or, in an embodiment where there are multiple device clocks, the reference clock may broadcast the synchronization message to all of the device clocks that will be synchronized). The device clock 101, when it receives this message, will record its own local time $T_2$, and send a message 104 back to the reference clock 102. When sending this second message 104 to the reference clock 102, the device clock 101 will record its own local time $T_3$. When this message is received by the reference clock 102, the reference clock will respond with its own message 105, including in this message the reference clock's local time $T_4$ of when it received the message from the device clock 101.

In a process such as shown in FIG. 1, after the device clock 101 has received the second message from the reference clock 102, the device clock 101 will know $T_1$—Local time as measured by the reference clock when the reference clock sent its first message $T_2$—Local time as measured by the device clock when the device clock received the reference clock's first message $T_3$—Local time as measured by the device clock when the device clock sent its first message $T_4$—Local time as measured by the reference clock when it received the device clock's first message It can use this information to calculate the difference between local time as measured by the device clock 101 and local time as measured by the reference clock 102 using the equation $$D=(T_2-T_1-T_4+T_3)/2$$

Once this calculation is complete, the device clock 101 can then subtract the difference value from its own local time to synchronize its own local time measurements with the local time measurements of the reference clock 102.

Of course, it should be understood that, while FIG. 1 and the accompanying description provided an approach for synchronizing one or more device clocks to a reference clock, variations on that approach, as well as other approaches, are possible and could be implemented by those of ordinary skill in the art without undue experimentation. For example, in some embodiments, a device clock and a reference clock may perform many iterations of a process such as described above, and then determine an average difference based on the data gathered in each of those iterations so as to compensate for variations in network transit time. Similarly, in some embodiments synchronization approaches such as network time protocol (described at https://en.m.wikipedia.org/wiki/Network_Time_Protocol, which is incorporated by reference in its entirety) or synchronization using a GPS receiver (as described at https://en.m.wikipedia.org/wiki/Global_Positioning_System, which is incorporated by reference in its entirety) could also be used. Accordingly, the illustration of FIG. 1 and the associated discussion of synchronization should be understood as being illustrative only, and should not be treated as limiting.

Figure 2:
FIG. 2 provides a high-level overview of an environment in which a plurality of video streams may be captured.
Figure 2:
Figure 2:
Figure 2:
Figure 2:
Figure 2:
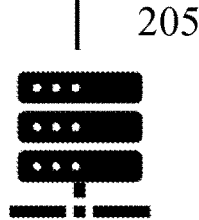
Figure 2:
Figure 2:

Turning now to FIG. 2, that figure provides a high level overview of an environment in which a plurality of video streams may be captured. As shown in FIG. 2, such an environment may include a plurality of perspective cameras 201 202 203 each of which will preferably be coupled to or comprise a computing device with a clock that has previously been synchronized to a reference clock using a process such as described in the context of FIG. 1. In the environment of FIG. 2, each of the perspective cameras 201 202 203 captures a video stream depicting an event 204. The perspective cameras 201 202 203 would preferably enhance their video streams with data such as their local time and angular velocity measurements when the images making up those streams were captured, and then send those enhanced video streams to a gateway server 205 for processing. The gateway server 205 would then transform the enhanced video streams from the perspective cameras 201 202 203 to a form suitable for display to a user, such as by decompressing encoded video data and/or applying smoothing functions or other enhancements.

In the environment of FIG. 2, after the gateway server 205 has transformed the streams from the perspective cameras 201 202 203 into a form suitable for display to a user, they could be sent to a technician console 206 and to a distribution server 207. At the technician console 206, a user (e.g., a technician hired by a network broadcasting the event) could assemble the streams from the perspective cameras 201 202 203, potentially with other data as well (e.g., a video stream from a sideline camera 208) to create a combined representation of the event 204 (e.g., a television broadcast that might switch between multiple perspectives in order to provide a compelling experience of the event 204 for a viewer). At the distribution server 207, the streams could be made available to viewers who may want to view the various streams of the event 204 synchronized with a broadcast representation created by the technician and/or with each other. For example, the streams could be stored along with metadata indicating the clock time at which the streams (or various parts of the streams) were captured, the device that captured each particular stream, and the event to which each stream relates, so that a viewer could subsequently obtain particular portions of the streams by specifying device, event and time information for the relevant portions to be displayed to a user.

Figure 3:
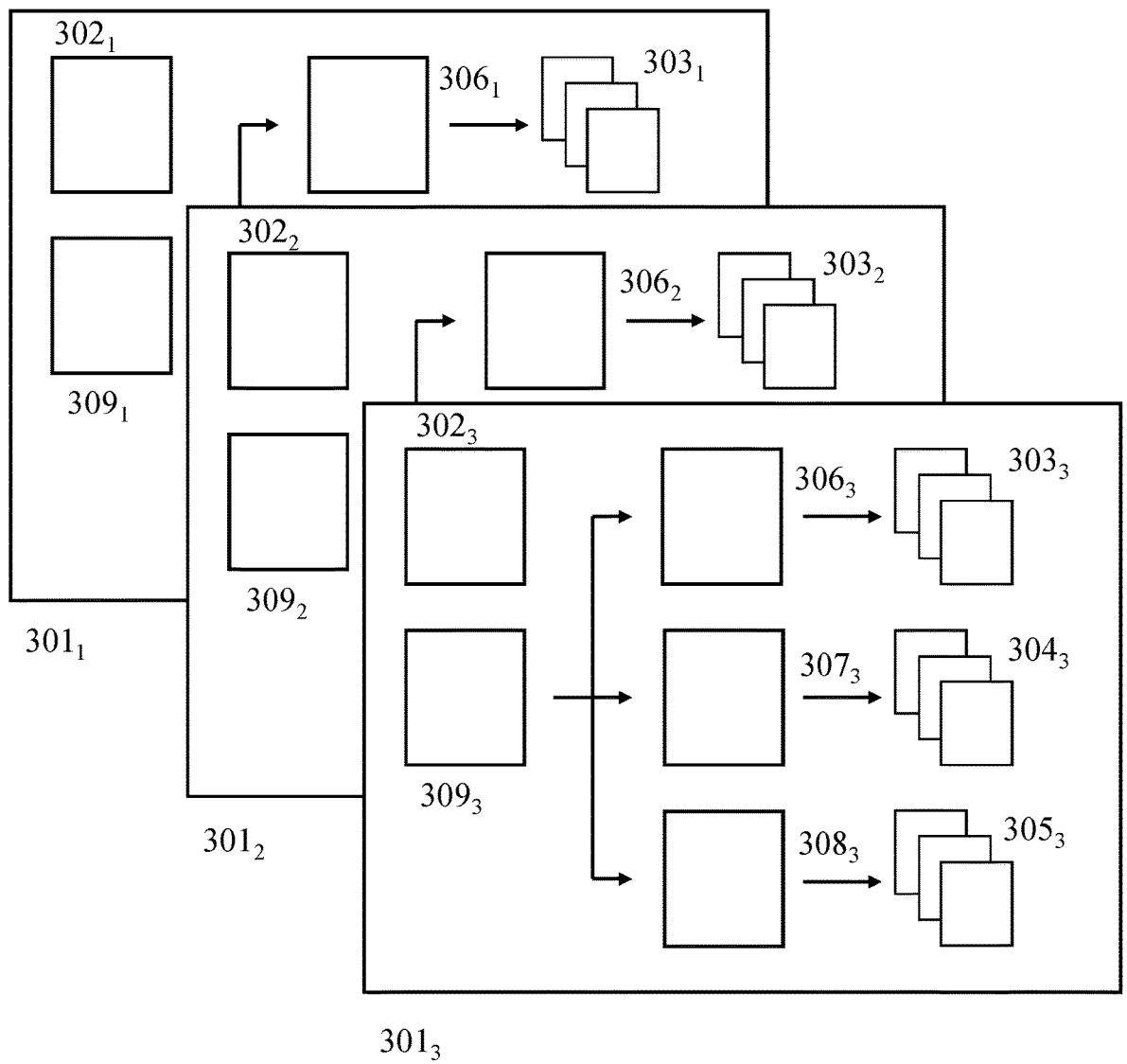
FIG. 3 provides a high-level view of how information from video streams can be made available for synchronized viewing.

Turning now to FIG. 3, that figure provides a high-level view of how information from video streams can be made available for synchronized viewing. Specifically, FIG. 3 illustrates a plurality of data structures $301_1$ $301_2$ $301_3$ corresponding to individual video streams of an event (e.g., streams from the perspective cameras 201 202 203 of FIG. 2). As depicted in FIG. 3, each of those data structures includes stream information $302_1$ $302_2$ $302_3$, such as a unique identifier of a device that captured the particular stream. The data structures also each include multiple sets of video files $303_1$ $303_2$ $303_3$ $304_3$ $305_3$. Preferably, for each data structure, each of that structure's sets of video files will encode the same video stream (e.g., as a sequence of transport stream, or *.ts files) at different quality levels. In this way, if there is a quality change in the network connection between the server storing the structures and a viewer watching a stream, the server storing the structures will be able to switch from one quality level to another in order to provide the optimal viewing experience given the quality of the available network connection.

To facilitate dynamic quality switching during playback of a video stream, the data structures $301_1$ $301_2$ $301_3$ of FIG. 3 will preferably include indices $306_1$ $306_2$ $306_3$ $307_3$ $308_3$ corresponding to each set of video files $303_1$ $303_2$ $303_3$ $304_3$ $305_3$. These indices can include information such as, for each of the files in its corresponding set of video files, the clock time at which the first frame in that file was captured. Each data structure in FIG. 3 also includes a manifest $309_1$ $309_2$ $309_3$ identifying each of that data structure's indices. In practice, when a need to switch to a new quality level for a particular stream was detected, the manifest would be used to identify the index corresponding to the new quality level. The index would then be used to identify the specific file corresponding to the time the quality switch should take place, and that file could be sent to the viewer so that his or her experience could proceed without interruption regardless of the vagaries of his or her network connection.

Figure 4:
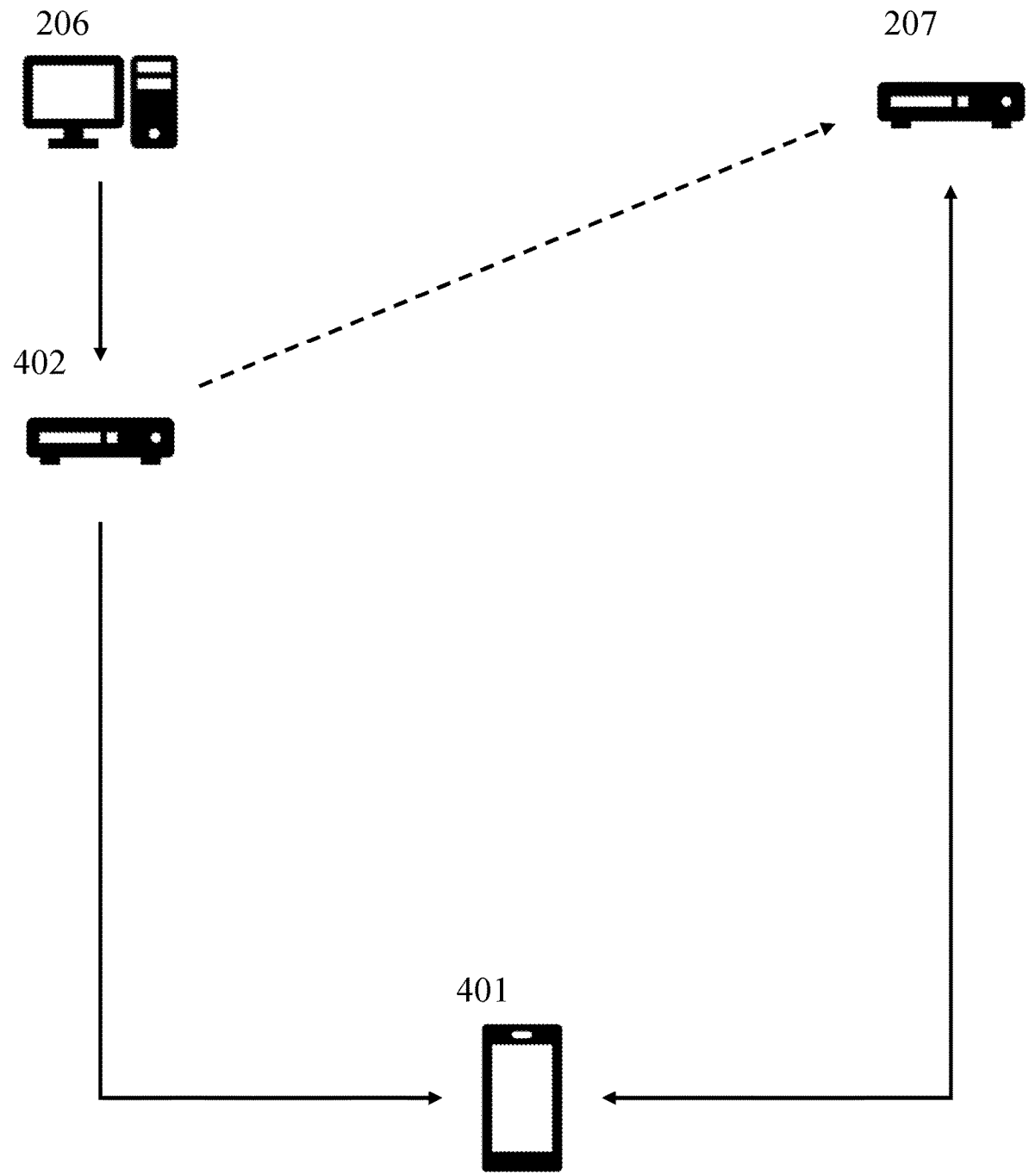
FIG. 4 provides a high-level overview of an environment in which a plurality of video streams may be provided for synchronized viewing.

Turning now to FIG. 4, that figure provides a high-level overview of an environment in which a plurality of video streams may be provided for synchronized viewing. As shown in FIG. 4, such an environment may include multiple paths over which video streams can be delivered to a viewing device 401. For example, there could be a broadcast channel, in which a video stream from a technician console 206 would be sent via other devices such as a headend server 402 to be displayed via an OTT app on the viewing device 401, and there could be a separate perspective channel in which a distribution server 207 could provide one or more additional video streams (e.g., streams captured by the perspective cameras 201 202 203 of FIG. 2) to be displayed synchronously with the stream from the broadcast channel.

As shown in FIG. 4, in some embodiments there may be communication between the headend server 402 that sends the broadcast stream to the viewing device 401 and the distribution server 207 that sends additional stream(s) to the viewing device 401. For example, in some embodiments, the headend server 402 may send the distribution server 207 a message indicating how much its stream is delayed relative to some set reference clock (e.g., official U.S. time as provided by the national institute of standards and technology) when it is displayed via an OTT app on the viewing device 401. To illustrate, consider an embodiment where footage of an event 204 captured by a sideline camera 208 as shown in the environment of FIG. 2 can be expected to be displayed via an OTT app 7.5 seconds after it is initially captured due to factors such as network latency, processing at the technician console 206, delays for content review, etc. In this type of embodiment, the headend server 402 could send a message to the distribution server 207 indicating that its (i.e., the headend server's) stream of the event could be expected to be displayed on the viewing device 401 via the OTT app 7,500 milliseconds after it was captured. The distribution server 207 could then use this information to manage offsets and synchronize the streams it would provide of the event 204 for display on the viewing device 401. A description of how this could take place is provided below in the context of FIG. 5.

Figure 5:
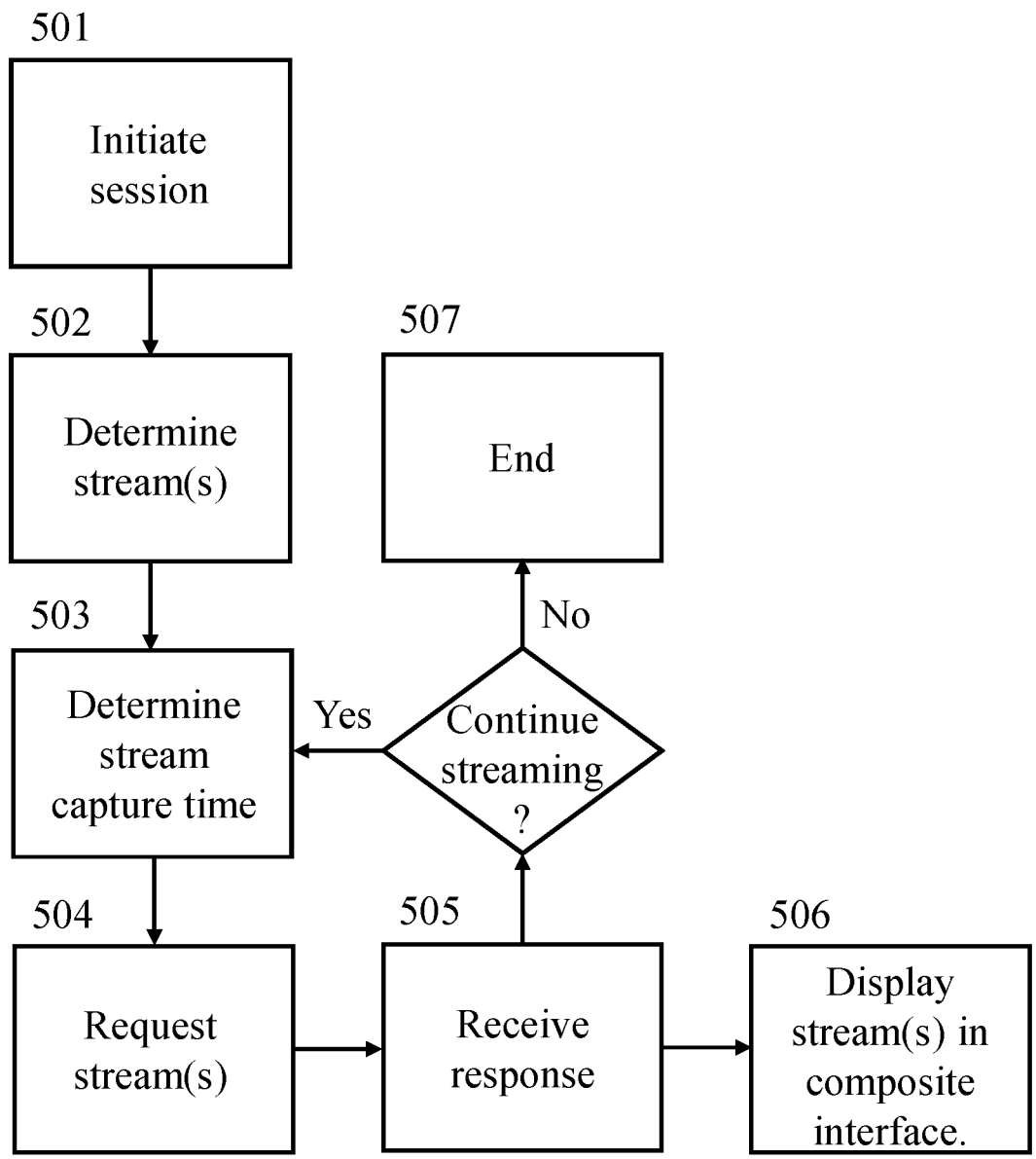
FIG. 5 shows a process in which multiple streams can be displayed in a synchronized manner.

Turning now to FIG. 5, that figure shows a process in which multiple streams can be displayed in a synchronized manner despite those streams being transmitted to the viewer over channels having different latencies. Initially in the process of FIG. 5, a viewing device 401 could initiate a session 501 with a distribution server 207 to obtain streams of an event. This could include activities such as synchronizing a clock on the viewing device 401 with a clock on the distribution server 207 (e.g., using a process such as described in the context of FIG. 1) and the viewing device 401 informing the distribution server 207 what event was being streamed. In some embodiments session initiation 501 could include other activities, either in addition to, or as alternatives to, activities such as described previously. For example, in some embodiments session initiation 501 could include the viewing device 401 informing the distribution server 207 of what channel the distribution server's streams should be synchronized to (e.g., what OTT app was being used to access the stream from the headend server 402), and the distribution server 207 informing the viewing device 401 of the time offset associated with that channel.

As another example, in some embodiments session initiation 501 could include the distribution server 207 providing the viewing device 401 with additional stream information, such as unique identifiers (e.g., machine IDs of cameras that captured individual streams) and/or human friendly identifiers (e.g., positions of players wearing cameras that captured individual streams) for streams, video parameters (e.g., frames per second, bit depth, etc.) of individual streams, and/or other parameters that may facilitate the selection and/or delivery of streams in those embodiments. Other types of session initiation 501 activities (e.g., validation, authentication, determination of network latency between the viewing device 401 and the distribution server 207) will be immediately apparent to those of ordinary skill in the art, and may be performed in some embodiments. Accordingly, the exemplary session initiation activities described above should be understood as being illustrative only, and should not be treated as limiting on the scope of protection provided by this document or any related document.

Continuing with the discussion of FIG. 5, after a session has been initiated 501, the viewing device 401 would determine 502 which stream(s) to request from the distribution server 207. This could be done, for example, by presenting a user an interface allowing him or her to select stream(s) of interest (e.g., by specifying the positions of players wearing point of view cameras whose perspectives the user is interested in) then, if necessary, translating that selection into a machine friendly form to request those stream(s) from the distribution server 207. Once the stream(s) had been determined, the process of FIG. 5 continues with a determination 503 of the capture time at which the viewing device should request those streams. This could be done, for example, by subtracting the offset associated with the stream from the headend server 402 from the time provided by the clock on the viewing device that had been synchronized with the clock from the distribution server 207 during initiation 501 (and, in some embodiments, also subtracting the network latency between the distribution server and the viewing device).

In the process of FIG. 5, after the streams and capture times had been determined 502 503 the viewing device 401 would request 504 the stream(s) from the distribution server 207 using the determined capture times, and would receive 505 the requested stream(s) in response. To illustrate how this could be done, consider table 1, which provides exemplary JSON communications which could take place in the request 504 and response 505 steps of FIG. 5.

TABLE 1

Exemplary JSON communications to request and receive a ten second video

```
REQUEST:
{
   "selects": "videos",
   "sMIDs":["01234567012345671"],
   "dStartTime": 1586959588.000,
   "iDurationMS":10000,
   "output_format":{
      "aspect":"default",
      "fps":30,
      "delivery:":"uri_blobs"
      },
   "iPrecision": 1
}
RESPONSE:
{
   "output":"uri_blobs",
   "dStartTime": 1586959588.000,
   "dEndTime": 1586959598.000",
   "format":"mp4"
   "videos": "blob:http://192.168.42.2/video_ID1"
}
```

In the exemplary communications of table 1, a viewing device 401 would request a particular video by specifying the identification of the camera (sMID) which captured the stream of interest to the viewer, the duration requested in milliseconds (iDurationMS), the capture time of the first frame of that video (dStartTime), and the parameters with which the video should be delivered (output_format). In some embodiments, upon receiving this request, a distribution server 207 could translate its internal representation of the requested video (e.g., the appropriate set of files $303_1$ $303_2$ $303_3$ $304_3$ $305_3$ for the connection between the distribution server and the viewing device, in embodiments following FIG. 3) to the requested output format, and then provide that video to the viewing device (e.g., as a blob URI, as indicated in the example of table 1, or via some other type of file transfer).

Other types of request 504 and response 505 communications may also be possible in some embodiments. For example, tables 2 and 3 provide additional exemplary JSON communications that could be used to make various types of requests in some embodiments.

TABLE 2

Exemplary JSON communications to request three ten second videos and receive them in the form of three separate videos

```
REQUEST:
{
  "selects": "videos",
  "sMIDs":["0123456701234567","1123456701234567",
"2123456701234567",]
    "dStartTime":"1586959588.000",
    "iDurationMS":10000,
    "output_format":{
      "aspect":"default",
      "fps":30,
      "delivery":"uri_blobs"
      },
    "iPrecision": 1
}
RESPONSE:
{
  "output": "uri_blobs",
  "dStartTime": 1586959588.000,
  "dEndTime": 1586959598.000,
  "videos": [
    {
      "MID": "0123456701234567",
      "videos": [
        " blob:http://192.168.42.2/video_ID2"
      ]
    },
    {
      "MID": "1123456701234567",
      "videos": [
        " blob:http://192.168.42.2/video_ID3"
      ]
    },
    {
      "MID": "2123456701234567",
      "videos": [
        " blob:http://192.168.42.2/video_ID4"
      ]
    }
  ]
}
```

TABLE 3

Exemplary JSON communications to request three ten second videos and receive them in the form of a single composite

```
REQUEST:
{
  "selects": "videos",
  "sMIDs":["0123456701234567","1123456701234567",
"2123456701234567"],
    "dStartTime":"1586959588.000",
    "iDurationMS":10000,
    "output_format":{
      "aspect":"default",
      "fps":30,
      "delivery":"uri_composite"
      },
    "iPrecision": 1
}
RESPONSE:
{
  "output":"uri_composite",
  "dStartTime": 1586959588.000,
  "dEndTime": 1586959589.000,
  "format":"mp4"
  "videos":[" blob:http://192.168.42.2/video_ID5"]
```

TABLE 3-continued

Exemplary JSON communications to request three ten second videos and receive them in the form of a single composite

```
}
```

In the examples of tables 2 and 3, the viewing device 401 would specify multiple streams (i.e., specify multiple sMID values) as well as if those streams should be provided as multiple streams (table 2) or as a single composite (table 3). Upon receiving these requests, a distribution server 207, in addition to performing stream selection and format translation as described in the context of table 1, could also, if appropriate (e.g., when a composite stream is requested) create a new stream that would be sent to the viewing device 401. The viewing device 401, once it received the responses of tables 2 and 3 could then simultaneously display the requested streams in a synchronized manner, either by determining how to display them and implementing that determination itself (e.g., when multiple streams were requested as in table 2) or by displaying a composite stream created by the distribution server 207 (e.g., when a composite stream was requested, as in table 3). Other types of communications (e.g., communications in formats other than JSON) are also possible, and will be immediately apparent to those of ordinary skill in light of this disclosure. Accordingly, the examples set forth above in tables 1-3 should be understood as being illustrative only, and should not be treated as limiting.

Moving on from the discussion of the request and response steps 504 505, after those steps are complete, the process of FIG. 5 continues with the viewing device 401 displaying 506 the requested stream(s). Simultaneously, to avoid interruptions in playback, the viewing device 401 will preferably loop back to determine 503 the time for and request 504 the next video to be played or, if the session has ended (e.g., if the user has closed the video player or selected a different event to stream on the viewing device 401), terminate 507 the session with the distribution server 207.

It should be understood that while FIGS. 1-5 and the associated text have described various ways in which multiple streams can be synchronously displayed in a composite interface, that description is intended to be illustrative only, and numerous variations would be immediately apparent to, and could be implemented without undue experimentation by, those of ordinary skill in the art For example, while FIG. 2 provides a high level overview of an environment in which a plurality of video streams may be captured, actual embodiments may diverge from the environment of FIG. 2. For example, in some embodiments, multiple video streams may be captured and processed in the environment and manner described in U.S. Pat. No. 9,591,041 titled Method and System for Stabilizing and Streaming First Person Perspective Video (the "'941 Patent"), the disclosure of which is hereby incorporated by reference in its entirety. Similarly, in some embodiments, various components illustrated in FIG. 2 may be combined, omitted, or related in different manners. For example, while FIG. 2 illustrated a technician console 206 obtaining display suitable streams from the gateway server 205, it is possible in some embodiments that a technician console 206 may obtain these display streams from a distribution server 207, and may not have a direct communicative connection with the gateway server 205. Other variations are possible and will be immediately apparent to those of ordinary skill in the art in light of this disclosure. Accordingly, the high-level environment overview of FIG. 2 should be understood as being illustrative only, and should not be treated as implying limitations on the protection provided by this document or by any related document.

As another example of a potential variation, consider how different embodiments may determine the delay between when a broadcast stream is captured versus when it is displayed. For example, in some embodiments, rather than a distribution server 207 receiving a time offset value from a headend server 402 as shown in FIG. 4, an entity operating a distribution server 207 could have a relationship to an entity providing the broadcast stream, and could obtain information from the broadcasting entity indicating the time offset by which the broadcast stream would be delayed. As another alternative, in some embodiments an application used to display streams from the distribution server 207 could be provided with time synchronization fingerprints for the broadcast stream (e.g., audio signposts) and could directly determine the time offset for the broadcast stream by comparing the time(s) it detects the synchronization fingerprint(s) with the capture times for the corresponding portion(s) of the broadcast stream.

As an example of yet another type of variation, consider modifications in how a broadcast stream could be presented relative to the corresponding perspective stream(s). For example, in some embodiments, rather than displaying a broadcast stream in an OTT app on a viewer device 401, a broadcast stream may be displayed on a separate device (e.g., a television) than the viewing device 401 used to view the perspective streams. In such an embodiment, preferably the application used to view the perspective streams on the viewing device will include functionality for determining the offset of the broadcast stream. This could be done, for example, by presenting an interface allowing the user to specify the channel (e.g., cable provider and region) through which the broadcast stream was received and then correlating this channel information with offset information previously stored at the distribution server 207, by using time synchronization fingerprints, or using other synchronization methods as may be appropriate in the context of a particular embodiment. Similarly, in some embodiments, the disclosed technology could be used to synchronize perspective streams with a broadcast stream which was provided on replay, or could be used to track the progress of a broadcast stream (e.g., using time synchronization fingerprinting) and to ensure that the perspective streams are presented in a manner that has a synchronized 1 second/second relationship with the broadcast stream despite the broadcast stream potentially being a replay or having interruptions such as being paused by the user. Accordingly, the description set forth previously of synchronizing streams on an OTT app on a viewing device should be understood as being illustrative only, and should not be treated as limiting.

It is also possible that, in some embodiments, aspects of the disclosed technology could be applied in contexts other than simultaneous display of broadcast and perspective streams. To illustrate, consider a case in which images of an event are used to create a volumetric model that could be used to create a stream with a virtual camera. In such a case, the creation of the volumetric model could be created in a manner that benefits from having multiple images from multiple perspectives that could be correlated to create the volumetric image. In some embodiments, aspects of the disclosed technology could be used to identify specific images from a plurality of perspective streams (e.g., streams captured using cameras integrated into instrumented helmets as described in the '941 Patent) so that those images could be correlated with each other and with images from any other streams that may be available (e.g., a sideline camera 208 as illustrated in FIG. 2), thereby providing further information that could be used to facilitate the creation of a volumetric model. Examples of communications that could be used in this type of embodiment are provided in tables 4-8, below.

TABLE 4

Exemplary JSON communications to request a single image from a specified stream.

```
REQUEST:
{
  "selects": "images",
  "sMIDs":["0123456701234567"],
  "dStartTime": 1586959588.000,
  "iDurationMS":1,
  "output_format":{
    "aspect":"default",
    "fps":30,
    "delivery":":"uri_blobs"
    },
  "iPrecision": 1
}
RESPONSE:
{
  "output":"uri_blobs",
  "dStartTime": 1586959588.000,
  "dEndTime": 1586959588.001",
  "format":"jpeg"
  "images":["blob:https://192.168.42.2/image_ID1"]
}
```

TABLE 5

Exemplary JSON communications to request an array of images from a specified stream.

```
REQUEST:
{
  "selects": "images",
  "sMIDs":["0123456701234567"],
  "dStartTime":1586959588.000,
  "iDurationMS":1000,
  "output_format":{
    "aspect":"default",
    "fps":30,
    "delivery":":"uri_blobs"
    },
  "iPrecision": 1
}
RESPONSE:
{
  "output":"uri_blobs",
  "dStartTime":1586959588.000,
  "dEndTime": 1586959588.100,
  "images":["blob:https://192.168.42.2/image_ID2",
"blob:https://192.168.42.2/image_ID3", . . . .
"blob:https://192.168.42.2/image_ID1002"]
}
```

TABLE 6

Exemplary JSON communications to request three images from three streams at a single point of time.

```
REQUEST:
{
  "selects": "images",
"sMIDs":["0123456701234567","1123456701234567",
"2123456701234567"],
  "dStartTime":"1586959588.000",
  "iDurationMS":1,
  "output_format": {
```

TABLE 6-continued

Exemplary JSON communications to request three images from three streams at a single point of time.

```
      "aspect":"default",
      "fps":30,
      "delivery:":"uri_blobs"
      },
   "iPrecision": 1
}
RESPONSE:
{
   "output": "uri_blobs",
   "dStartTime": 1586959588.000,
   "dEndTime": 1586959588.001,
   "images": [
      {
         "MID": "0123456701234567",
         "images": [
            "blob:https://192.168.42.2/image_IDA1"
         ]
      },
      {
         "MID": "1123456701234567",
         "images": [
            "blob:https://192.168.42.2/image_IDA2"
         ]
      },
      {
         "MID": "2123456701234567",
         "images": [
            "blob:https://192.168.42.2/image_IDA3"
         ]
      }
   ]
}
```

TABLE 7

Exemplary JSON communications to obtain one second of images from three streams at a point in time.

```
REQUEST:
{
   "selects": "images",
"sMIDs":["0123456701234567","1123456701234567",
"2123456701234567"],
      "dStartTime":"1586959588.000",
      "iDurationMS":1000,
      "output_format":{
         "aspect":"default",
         "fps":30,
         "delivery:":"uri_blobs"
         },
      "iPrecision": 1
}
RESPONSE:
{
   "output": "uri_ blobs",
   "dStartTime": 1586959588.000,
   "dEndTime": 1586959589.000,
   "images": [
      {
         "MID": "0123456701234567",
         "images": [
            "blob:https://192.168.42.2/image_IDB1",
            "blob:https://192.168.42.2/image_IDB2",
            "blob:https://192.168.42.2/image_IDB3",
            ...
            "blob:https://192.168.42.2/image_IDB1000"
         ]
      },
      {
         "MID": "1123456701234567",
         "images": [
            "blob:https://192.168.42.2/image_IDC1",
            "blob:https://192.168.42.2/image_IDC2",
            "blob:https://192.168.42.2/image_IDC3",
```

TABLE 7-continued

Exemplary JSON communications to obtain one second of images from three streams at a point in time.

```
            ...
            "blob:https://192.168.42.2/image_IDC1000"
         ]
      },
      {
         "MID": "2123456701234567",
         "images": [
            "blob:https://192.168.42.2/image_IDD1",
            "blob:https://192.168.42.2/image_IDD2",
            "blob:https://192.168.42.2/image_IDD3",
            ...
            "blob:https://192.168.42.2/image_IDD1000"
         ]
      }
   ]
}
```

TABLE 8

Exemplary JSON communications to obtain three images from three streams at a point in time and deliver them as a 1x3 composite image.

```
REQUEST:
{
   "selects": "images",
"sMIDs":["0123456701234567","1123456701234567",
"2123456701234567"],
      "dStartTime":"1586959588.000",
      "iDurationMS":1,
      "output_format":{
         "aspect":"default",
         "fps":30,
         "delivery:":"uri_composite"
         },
      "iPrecision": 1
}
RESPONSE:
{
   "output":"uri_composite",
   "dStartTime": 1586959588.000,
   "dEndTime": 1586959588.001",
   "format":"jpeg"
   "images":["blob:https://192.168.42.2/image_IDX"]
}
```

Figure 6A:
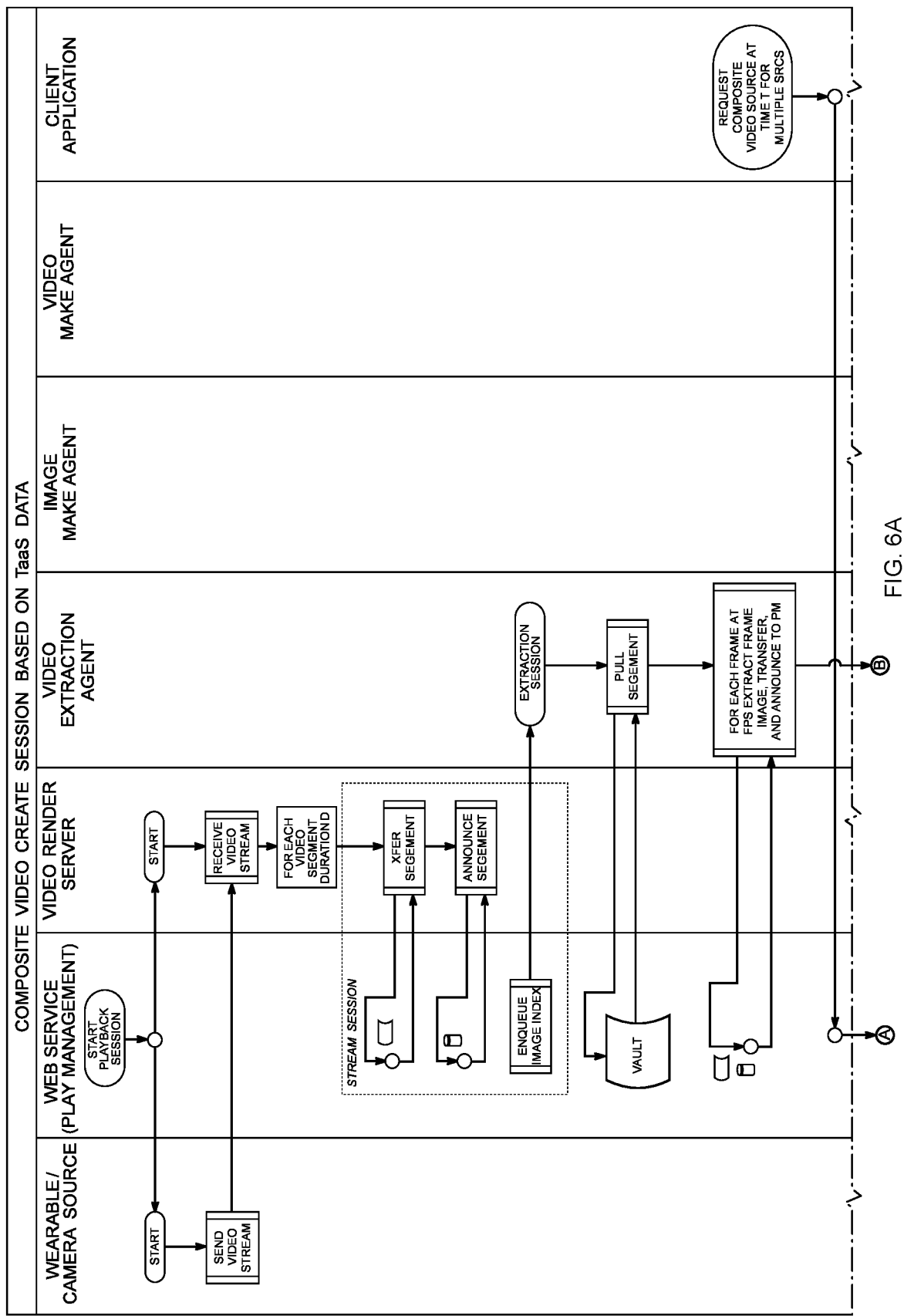

As a further illustration of how the disclosed technology could potentially be applied, consider FIGS. 6A and 6B, which show a set of interactions that may be performed to provide composite multi-stream synchronization in some embodiments. Initially, in the diagram of FIG. 6A, a play management web service would begin a playback session. For example, it could synchronize clocks with a plurality of wearable cameras that would capture streams that would be played back synchronously with a master stream that would be delivered via a separate channel. As those streams were captured on the wearable cameras, they could be sent to a video rendering server that would store various stream segments in a database (e.g., as file sets such as shown in FIG. 3) along with data for those streams such as their start times and encoding parameters. A video extraction agent could then place the videos into a long-term storage vault, and extract images for each of the frames of the video so that those images could be made available on the play management web service.

In the interactions of FIGS. 6A-6B, to retrieve videos (e.g., for display on a viewing device) or images (e.g., for use in creating a volumetric model), a client application would request the video(s) and/or image(s). This could trigger agents on a workflow server (e.g., the server hosting the play management webservice) to retrieve and create package the requested video(s) and/or image(s) for delivery. The packaged image(s) and/or video(s) could then be made available through the play management server, and then transmitted to the client application for utilization, such as in a composite video display or in creating a volumetric model as described previously.

Other implementation variations are also possible beyond utilization of the various agents and other entities illustrated in FIGS. 6A and 6B. For example, in some embodiments, instead of synchronizing clocks, information could be gathered on the differences between the various clocks involved in capturing, transmitting and requesting a set of stream and then using those differences to determine the appropriate information to return when a particular device/application requests a video or stream using its own local time. Similarly, in some cases, rather than relying on a user specifying how/if streams could be composited together, a distribution server could maintain event information specifying default stream combinations for specific times in an event that had been determined (e.g., by a technician using a technician console 206) to be likely to provide a particularly good experience for a viewer.

As another example of a potential type of implementation variation, in some embodiments various streams may be synchronized without requiring a viewing device to request the specific times the streams it would display were captured. For example, in some embodiments, rather than specifying a capture time for a stream to be retrieved, a viewing device 401 could specify a broadcast stream and channel, and a distribution server 207 could provide the requested streams for the event represented by that broadcast stream at a time determined by subtracting the broadcast stream's time offset from the then current clock time. In this way, the time when specific streams are captured could continue to flow through, and control synchronization of, the entire system even though that time may not be known to the ultimate viewing device 401.

Other variations could be implemented, and will be immediately apparent to those of ordinary skill in the art. Accordingly, in light of the potential for variations and modifications to the material described explicitly herein, the disclosure of this document should not be treated as implying limits on the protection provided by this document or any related document. Instead, the protection provided by a document which claims the benefit of or is otherwise related to this document should be understood as being defined by its claims, when the terms in those claims which are explicitly defined under the "Explicit Definitions" heading are given their explicit definitions, and when all other terms are given their broadest reasonable interpretation as shown by a general purpose dictionary. To the extent that the interpretation which would be given to the claims based on the above disclosure is in any way narrower than the interpretation which would be given based on the explicit definitions under the "Explicit Definitions" heading and the broadest reasonable interpretation as provided by a general purpose dictionary, the interpretation provided by the explicit definitions under the "Explicit Definitions" heading and broadest reasonable interpretation as provided by a general purpose dictionary shall control, and the inconsistent usage of terms in the specification shall have no effect.

EXPLICIT DEFINITIONS

When used in the claims, "based on" should be understood to mean that something is determined at least in part by the thing that it is indicated as being "based on." When a claim is written to require something to be completely determined by a thing, it will be described as being "based EXCLUSIVELY on" the thing.

When used in the claims, a "computer" should be understood to refer to a group of devices (e.g., a device comprising a processor and a memory) capable of storing and executing instructions for performing one or more logical and/or physical operations on data to produce a result. A "computer" may include, for example, a single-core or multi-core microcontroller or microcomputer, a desktop, laptop or tablet computer, a smartphone, a server, or groups of the foregoing devices (e.g., a cluster of servers which are used in combination to perform operations on data for purposes such as redundancy and availability).

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Examples of computer readable mediums including the following, each of which is an example of a non-transitory computer readable medium: volatile memory within a computer (e.g., RAM), registers, non-volatile memory within a computer (e.g., a hard disk), distributable media (e.g., CD-ROMs, thumb drives), and distributed memory (e.g., RAID arrays).

When used in the claims, to "configure" a computer should be understood to refer to providing the computer with specific data (which may include instructions) and/or making physical changes in the computer (e.g., adding peripherals) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

The invention claimed is:
1. A system comprising:
a) a plurality of capture devices;
b) a user computer located remotely from the plurality of capture devices;
c) a server located remotely from the user computer and the plurality of capture devices;
wherein:
A) the server computer is configured to receive data from the user computer requesting two or more streams captured by the plurality of capture devices;
B) the user computer is configured to simultaneously display a first image from a first stream from the two or more streams and a second image from a second stream from the two or more streams based on coordinating capture times for the first and second streams' images using time offsets corresponding to those streams;
C) the time offset corresponding to the first stream is a delay between data being sent from a first capture device and being available at the user computer;
D) the time offset corresponding to the second stream is a delay between data being sent from a second capture device and being available at the user computer; and

E) the user computer is configured to:
   I) determine a first capture time based on the time offset corresponding to the first stream;
   II) determine a second capture time based on the time offset corresponding to the second stream; and
   III) request delivery of the first stream using the first capture time and the second stream using the second capture time.

2. The system of claim 1, wherein the server:
   a) is in communication with, and configured to receive streams from, the plurality of capture devices; and
   b) is configured to, for each of the plurality of capture devices, determine a delay between data being sent from that capture device and being received at the server.

3. The system of claim 1, wherein the server is configured to determine a delay between data being sent from the server and being received at the user computer.

4. The system of claim 1, wherein the server is configured to:
   a) receive streams from each of the plurality of capture devices; and
   b) for each stream received from one of the plurality of capture devices: store a plurality of data structures, wherein each of the plurality of data structures encodes a portion of that stream and is stored with a corresponding capture time.

5. The system of claim 1, wherein the server is configured to, in response to a request form the user computer, initiate a streaming session with the user computer, wherein initiating the streaming session with the user computer comprises synchronizing a clock on the server with a clock on the user computer.

6. A method comprising:
   a) receiving, from a user computer, a request for two or more streams comprising a first stream captured by a first capture device and a second stream captured by a second capture device for simultaneous display in an interface of the user computer, wherein the user computer is located remotely from both the first capture device and the second capture device;
   b) determining portions of the first stream and the second stream to provide to the user computer based on coordinating capture times for the first and second streams' images using time offsets corresponding to those streams; and
   c) providing the user computer access to the determined portions of the first and second streams;
   wherein:
   A) the time offset corresponding to the first stream is a delay between data being sent from the first capture device and being available at the user computer;
   B) the time offset corresponding to the second stream is a delay between data being sent from the second capture device and being available at the user computer;
   C) the method is performed based on execution, by a server, of instructions stored on a non-transitory computer readable medium;
   D) providing the user computer access to the determined portions of the first and second streams comprises the server sending the determined portions of the first and second streams to the user computer;
   E) the method comprises determining a delay between data being sent from the server and being received at the user computer; and
   F) determining portions of the first stream and the second stream to provide to the user computer based on coordinating capture times for the first and second streams' images using time offsets corresponding to those streams comprises:
      I) determining a first capture time based on the time offset corresponding to the first stream;
      II) determining a second capture time based on the time offset corresponding to the second stream;
      III) determining a portion of the first stream to send to the user computer based on the first capture time;
      IV) determining a portion of the second stream to send to the user computer based on the second capture time; and
      V) sending the determined portions of the first and second streams to the user computer.

7. The method of claim 6, wherein the method is performed by a server:
   a) the method is performed based on execution, by a server, of instructions stored on a non-transitory computer readable medium;
   b) providing the user computer access to the determined portions of the first and second streams comprises the server sending the determined portions of the first and second streams to the user computer;
   c) the method comprises:
      i) determining a delay between data being sent from the first capture device and being available at the server; and
      ii) determining a delay between data being sent from the second capture device and being available at the server; and
   d) the server is located remotely from the user computer, the first capture device, and the second capture device.

8. The method of claim 6, wherein:
   a) the method is performed based on execution, by a server, of instructions stored on a non-transitory computer readable medium;
   b) the method comprises, for each of the first stream and the second stream: storing a plurality of data structures, wherein each of the plurality of data structures encodes a portion of that stream and is stored with a corresponding capture time.

9. The method of claim 6, wherein:
   a) the method is performed based on execution, by a server, of instructions stored on a non-transitory computer readable medium; and
   b) the method comprises, in response to a request form the user computer, initiating a streaming session with the user computer, wherein initiating the streaming session with the user computer comprises synchronizing a clock on the server with a clock on the user computer.

10. The method of claim 9, wherein the method is performed in real time during the streaming session.

11. A system comprising:
   a) a plurality of capture devices;
   b) a user computer located remotely from the plurality of capture devices;
   c) a server located remotely from the user computer and the plurality of capture devices;
   wherein:
   A) the server computer is configured to receive data from the user computer requesting two or more streams captured by the plurality of capture devices;
   B) the user computer is configured to simultaneously display a first image from a first stream from the two or more streams and a second image from a second stream from the two or more streams based on coordinating capture times for the first and second streams' images using time offsets corresponding to those streams;
C) the time offset corresponding to the first stream is a delay between data being sent from a first capture device and being available at the user computer;
D) the time offset corresponding to the second stream is a delay between data being sent from a second capture device and being available at the user computer;
E) the server is configured to:
  I) determine a first capture time based on the time offset corresponding to the first stream;
  II) determine a second capture time based on the time offset corresponding to the second stream;
  III) determine a portion of the first stream to send to the user computer based on the first capture time;
  IV) determine a portion of the second stream to send to the user computer based on the second capture time; and
  V) send the determined portions of the first and second streams to the user computer.

12. A method comprising:
a) receiving, from a user computer, a request for two or more streams comprising a first stream captured by a first capture device and a second stream captured by a second capture device for simultaneous display in an interface of the user computer, wherein the user computer is located remotely from both the first capture device and the second capture device;
b) determining portions of the first stream and the second stream to provide to the user computer based on coordinating capture times for the first and second streams' images using time offsets corresponding to those streams;
c) providing the user computer access to the determined portions of the first and second streams;
wherein:
A) the time offset corresponding to the first stream is a delay between data being sent from the first capture device and being available at the user computer;
B) the time offset corresponding to the second stream is a delay between data being sent from the second capture device and being available at the user computer;
C) the method is performed based on execution, by a server, of instructions stored on a non-transitory computer readable medium;
D) providing the user computer access to the determined portions of the first and second streams comprises the server sending the determined portions of the first and second streams to the user computer;
E) the method comprises determining a delay between data being sent from the server and being received at the user computer; and
F) determining portions of the first stream and the second stream to provide to the user computer based on coordinating capture times for the first and second streams' images using time offsets corresponding to those streams comprises:
  I) receiving, from the user computer, a first capture time for the first stream, and a second capture time for the second stream, wherein the first capture time and the second capture time are separated by a time difference corresponding to a difference between the time offset corresponding to the first stream and the time offset corresponding to the second stream; and
  II) identifying portions of the first and second streams corresponding to, respectively, the first and second capture times.

* * * * *